3,328,247
PHARMACEUTICAL COMPOSITIONS CONTAINING CERTAIN ARYLTHIO- AND/OR ARYLSULPHONYL-ALIPHATIC ACID DERIVATIVES AND PROCESS OF USING SAME FOR REDUCTION OF SERUM LIPID LEVELS
Wilson Shaw Waring, Alderley Park, Macclesfield, England, assignor to Imperial Chemical Industries Limited, London, England, a corporation of Great Britain
No Drawing. Filed Mar. 4, 1963, Ser. No. 262,330
Claims priority, application Great Britain, Mar. 28, 1962, 11,880/62
11 Claims. (Cl. 167—65)

This invention relates to pharmaceutical compositions and more particularly it relates to pharmaceutical compositions containing aliphatic acid derivatives which possess useful therapeutic properties.

According to the invention we provide pharmaceutical compositions comprising as active ingredient at least one aliphatic acid derivative of the formula $$X.A.CR^1R^2 \cdot COOH$$

wherein X stands for an aryl radical, optionally substituted, wherein A stands for the sulphur atom or the sulphonyl (SO$_2$) radical, wherein R$^1$ and R$^2$, which may be the same or different, stand for hydrogen or for alkyl radicals, or an ester or salt thereof, in admixture with an inert non-toxic diluent or carrier.

As a suitable value for X there may be mentioned, for example, a phenyl or naphthyl radical, optionally substituted by one or more halogen atoms, for example chlorine or bromine atoms, or by one or more aryl, for example phenyl, or alkoxy, for example methoxy radicals.

As a suitable value for R$^1$ or R$^2$ when it stands for an alkyl radical there may be mentioned, for example, an alkyl radical of not more than 6 carbon atoms, for example the methyl or ethyl radical.

As suitable esters there may be mentioned, for example, esters derived from aliphatic alcohols, for example aliphatic alcohols of not more than 6 carbon atoms, for example the methyl, ethyl or n-propyl ester. As suitable salts there may be mentioned, for example, the alkali metal salts, for example the sodium or potassium salts, or the alkaline earth metal salts, for example the calcium salts, or the ammonium salts.

Specific aliphatic acid derivatives which may be present in the said pharmaceutical compositions are α-(4-chlorophenylthio)isobutyric acid and the methyl, ethyl and n-propyl esters thereof and the calcium and potassium salts thereof, α-(4-bromophenylthio)isobutyric acid and the methyl and ethyl esters thereof, α-(3,4-dichlorophenylthio)isobutyric acid, α-(2-naphthylthio)isobutyric acid and the ethyl ester thereof, α-(4-methoxyphenylthio)isobutyric acid, α-(4-phenylphenylthio)isobutyric acid, α-(4-chlorophenylthio)acetic acid, α-phenylthioacetic acid, α-(4-chlorophenylthio)propionic acid, α - (4-chlorophenylthio) - α-methyl-n-butyric acid and the ethyl ester thereof, α-(4-bromophenylthio) - α - methyl-n-butyric acid, α-(4-chlorophenylsulphonyl)isobutyric acid and the methyl ester thereof, α-(4-bromophenylsulphonyl)isobutyric acid, α-(3, 4-dichlorophenylsulphonyl)isobutyric acid, α - (4 - chlorophenylsulphonyl)-α-methyl - n - butyric acid, α - (4-chloro phenylsulphonyl)propionic acid and α - (2 - naphthylsulphonyl)isobutyric acid.

The said pharmaceutical compositions may optionally contain, in addition to the said aliphatic acid derivative(s), at least one androstane derivative of the formula:

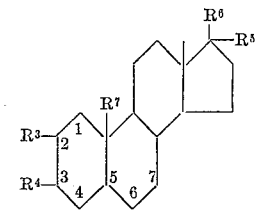

wherein R$^3$ stands for hydrogen or the hydroxymethylene radical, wherein R$^4$ stands for the hydroxy radical or for a doubly bound oxygen atom, wherein R$^5$ stands for the hydroxy radical, and wherein R$^6$ and R$^7$, which may be the same or different, stand for hydrogen or the methyl radical, or R$^5$ and R$^6$ together stand for a doubly bound oxygen atom, and wherein the bond joining the carbon atoms in the 4- and 5-positions is optionally a double bond, or a fatty acid ester thereof.

As a suitable fatty acid ester of the said androstane derivatives there may be mentioned, for example, a fatty acid ester derived from a fatty acid of not more than 25 carbon atoms.

As suitable androstane derivatives there may be mentioned, for example, 17α-hydroxyandrost-4-en-3-one, 17β-hydroxyandrostan-3 - one, testosterone, androstan-3α,17β-diol, 17β-hydroxy-19-norandrost-4-en-3-one, 17β-hydroxy-2-hydroxymethylene-17α-methylandrostan-3 - one, androsterone and its acetate, propionate and stearate, androst-4-en-3,17-dione, 3β-hydroxyandrostan-17-one and 17β-hydroxy-17α-methylandrost-4-en-3-one (methyltestosterone). Preferred androstan derivatives and androsterone, androsterone acetate and androsterone propionate.

The said pharmaceutical compositions may optionally contain an oestrogen as another additional ingredient, and suitable oestrogens are oestradiol, ethynyloestradiol, hexoestrol and stilboestrol. The said oestrogen is generally present to such an extent that the daily dose of oestrogen administered is within the range of from 0.1 mg. to 5.0 mg. Thus, oestradiol is usually given at the rate of between 0.2 mg. and 0.5 mg. per day, while stilboestrol or hexoestrol is usually given at the rate of between 0.1 mg. and 5 mg. per day.

The said pharmaceutical compositions may be formulated so as to be suitable for oral administration. Thus they may be formulated according to the known art as tablets, capsules, emulsions, suspensions, solutions or dispersible powders.

The tablet compositions of the invention may be coated or uncoated and they may be effervescent or non-effervescent. Conventional excipients for tablet formulations may be used, for example inert diluents, for example magnesium carbonate or lactose, disintegrating agents, for example maize starch or alginic acid, and/or lubricating agents, for example magnesium stearate. In the case of tablet compositions containing both an aliphatic acid derivative and an androstane derivative, the ratio of the proportions of these ingredients may vary, for example, from 100:1 to 5:1 respectively, and preferably from 40:1 to 20:1 respectively. When an oestrogen is also present in the tablet composition, the ratio of the proportion of androstane derivative to that of the oestrogen in the said tablet composition may vary, for example, from 500:1 to 10:1 respectively, such that the daily dose of oestrogen administered is within the range of from 0.1 mg. to 5.0 mg.

Liquid or solid formulations may be filled into capsules for oral administration. Suitable capsule compositions of the invention contain a solution of the said androstane derivative in an ester of the said aliphatic acid derivative which is liquid at ambient temperature, for example n-propyl α-(4-chlorophenylthio)-isobutyrate. The ratio of the proportion of the said androstane derivative to that of the said liquid ester may vary, for example, from 1:5 to 1:100 respectively, preferably from 1:20 to 1:40 respectively. Alternatively, the capsule compositions may contain a solution of the active ingredient(s) in a pharmaceutically-acceptable oil, for example vegetable or animal oil, for example sunflower seed oil, maize oil or cod-liver oil, and such solutions may contain conventional excipients, for example anti-oxidants, for example wheat germ oil. Solid formulations suitable for filling into capsules may contain a solid active ingredient in admixture with solid excipients known to have a buffering action, for example colloidal aluminium hydroxide or calcium hydrogen phosphate. In solid formulations containing both an androstane derivative and an oestrogen, the ratio of the proportion of androstane derivative to that of the oestrogen in the said compositions may vary, for example, from 500:1 to 10:1 respectively, such that the daily dose of oestrogen administered is within the range of 0.1 mg. to 5 mg.

Emulsion compositions may be formulated using as the non-aqueous phase an ester of the said aliphatic acid derivative which is liquid at ambient temperature; or a solution of the active ingredient(s) in an orally-acceptable oil, for example maize oil or cod-liver oil, may constitute the non-aqueous phase. The solvent oil used may be one that has itself been used in the treatment of atherosclerosis, for example sunflower seed oil. The emulsion compositions may contain conventional excipients, for example emulsifying agents, for example sorbitan trioleate, polyoxyethylene sorbitan mono-oleate, lecithin, gum acacia or gum tragacanth, preservatives, anti-oxidants, flavouring agents, sweetening agents and/or colouring materials.

Active ingredients which are insoluble or sparingly soluble in water may be formulated as suspensions, either in an aqueous base or in an emulsion base. Aqueous based suspensions are prepared with the aid of wetting agents, for example poly-ethylene oxide condensation products of alkylphenols, fatty alcohols or fatty acids, and suspending agents, for example a hydrophilic colloid, for example polyvinylpyrrolidone. Emulsion-based suspensions are prepared with the aid of emulsifying agents such as those described above. The suspension compositions of the invention may contain in addition such conventional excipients as sweetening agents, flavouring agents, colouring materials, preservatives and anti-oxidants.

The compositions of the invention may be in the form of a nutritive preparation in which the active ingredient(s) is or are mixed with proteins, for example casein, and carbohydrates. The compositions of the invention may contain, in addition to the active ingredient(s) dietary supplements, for example vitamins, salts of glycerophosphoric acid, choline and inositol, the combination of which is known to be effective in reducing serum cholesterol levels, and amino-acids, for example methionine.

The pharmaceutical compositions of the invention are useful in that they cause a reduction in serum lipid levels, for example serum cholesterol levels, and they are useful in the treatment of coronary artery disease and atherosclerosis. It is expected that the said compositions will generally be administered orally as capsules containing between 0.1 g. and 1 g. of a mixture of at least one of the said aliphatic acid derivatives and at least one of the said androstane derivatives, or as tablets containing between 0.1 g. and 1 g. of the said mixture of active ingredients. These compositions will generally be administered at such a rate that the patient receives a daily dosage of between 1 g. and 10 g. of the said mixture of active ingredients.

Some of the said aliphatic acid derivatives are new compounds, but all the said aliphatic acid derivatives may be manufactured by the adaptation of known procedures.

According to a further feature of the invention we provide the new compounds: methyl and n-propyl α-(4-chlorophenylthio)isobutyrate, α-(4-methoxyphenylthio)-isobutyric acid, α-(4-chlorophenylthio) - α - methyl-n-butyric acid and the ethyl ester thereof, α-(4-bromophenylthio)isobutyric acid and the methyl and ethyl esters thereof, α-(4-phenylphenylthio)isobutyric acid, α-(4-bromophenylthio)-α-methyl-n-butyric acid, α-(4-chlorophenylsulphonyl)propionic acid, α - (4 - chlorophenylsulphonyl) isobutyric acid and the methyl ester thereof, α-(4-bromophenylsulphonyl)isobutyric acid, α - (4 - chlorophenylsulphonyl) - α - methyl-n-butyric acid and α - (3,4-dichlorophenylsulphonyl)isobutyric acid.

The invention is illustrated but not limited by the following examples in which the parts are by weight:

*Example 1*

A mixture of 500 parts of α-(4-chlorophenylthio)isobutyric acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol. 3 parts of magnesium stearate are then added to the granules, which are then compressed to give tablets suitable for oral use for therapeutic purposes.

The above process is repeated except that the α-(4-chlorophenylthio)isobutyric acid is replaced by α-(3,4-dichlorophenylthio)propionic acid, α-(2 - naphthylsulphonyl)isotyric acid, α-(4-chlorophenylthio)acetic acid, α-(4-chlorophenylthio(propionic acid, α-(2 - naphthylsulphonyl)isobutyric acid, α-(4-bromophenylthio)isobutyric acid and α-(4-phenylphenylthio)isobutyric acid.

The α-(4-bromophenylthio)isobutyric acid may be obtained as follows:

A mixture of 15 parts of 4-bromothiophenol, 100 parts of acetone and 27 parts of sodium hydroxide pellets is heated under reflux, and 18 parts of chloroform are gradually added at such a rate that the mixture continues to reflux without further application of heat. When the addition is complete, the mixture is heated under reflux during 18 hours, and then the acetone is removed by distillation. The residue is dissolved in water, the solution is acidified with hydrochloric acid, and the resultant mixture is extracted with ether. Sodium bicarbonate solution is added to the ethereal extract, and the mixture is stirred and then separated. The aqueous phase is acidified with hydrochloric acid and filtered. The solid residue is washed with water, and crystallised from petroleum ether (B.P. 60–80° C.). There is thus obtained α-(4-bromophenylthio)isobutyric acid, M.P. 112° C.

α-(4-phenylphenylthio)isobutyric acid, M.P. 141° C., may be obtained as described in Example 2.

*Example 2*

200 parts of ethyl α-(4-chlorophenylthio)isobutyrate, 40 parts of androsterone propionate and 5 parts of wheat germ oil are dissolved in 750 parts of sunflower seed oil. The solution is filled into gelatin capsules which are then suitable for oral administration for therapeutic purposes.

The above process is repeated except that the ethyl α-(4-chlorophenylthio)isobutyrate is replaced by ethyl α-(2 - naphthylthio)isobutyrate, α - phenylthioacetic acid, ethyl α-(4 - chlorophenylthio)-α-methyl-n-butyrate, α-(4-chlorophenyluthio)-α-methyl-n-butyric acid, α-(4-bromophenylthio)-α-methyl-n-butyric acid, ethyl α-(4 - bromophenylthio)isobutyrate, methyl α-(4 - chlorophenylthio)isobutyrate, methyl α-(4 - bromophenylthio)isobutyrate, methyl α-(4-chlorophenylsulphonyl)isobutyrate, n-propyl α-(4-chlorophenylthio)isobutyrate or α-(4-methoxyphenylthio)isobutyric acid. There are thus obtained gelatin capsules which are suitable for oral administration for therapeutic purposes.

The ethyl α-(4 - chlorophenylthio)isobutyrate may be obtained as follows:

3.6 parts of sodium hydride (50% dispersion in oil) are added gradually to a cooled stirred solution of 10.8 parts of 4-chlorothiophenol in 50 parts of dry dimethylformamide keeping the temperature below 10° C. When the addition is complete the mixture is stirred at 10° C. for 30 minutes, and then 14.8 parts of ethyl α-bromoisobutyrate are added gradually, allowing the temperature of the mixture to rise to 45° C. The mixture is stirred at 40° C. for 1 hour; it is then cooled and 60 parts of cold water are added. The mixture is filtered, and the solid residue is crystallised from petroleum ether (B.P. 40–60° C.) giving ethyl α-(4-chlorophenylthio)isobutyrate, M.P. 46° C.

Ethyl α-(4-chlorophenylthio)-α-methyl-n-butyrate may be obtained by a similar process to that described above for the preparation of ethyl α-(4-chlorophenylthio)isobutyrate except that, after the addition of the cold water to the reaction mixture, the mixture is extracted with chloroform and the chloroform extract is washed successively with dilute sodium hydroxide solution and water, and then dried (anhydrous sodium sulphate). The solvent is removed by distillation and the residue is fractionally distilled under reduced pressure. There is thus obtained ethyl α-(4 - chlorophenylthio)-α-methyl-n-butyrate, B.P. 173° C./11 mm.

α-(4-chlorophenylthio)-α-methyl-n-butyric acid may be obtained as follows:

A mixture of 5 parts of ethyl α-(4-chlorophenylthio)-α-methyl-n-butyrate, 2.5 parts of potassium hydroxide and 2.5 parts of water is stirred and heated at 100° C. for 30 minutes. The mixture is diluted with an equal volume of water, and then extracted with ether. The aqueous phase is cooled and acidified with hydrochloric acid. The mixture is filtered and the solid residue is crystallised from petroleum ether (B.P. 40–60° C.). There is thus obtained α-(4 - chlorophenylthio)-α-methyl-n-butyric acid, M.P. 80° C.

In a similar manner there may be obtained α-(4-bromophenylthio)-α-methyl-n-butyric acid, M.P. 79° C. [from petroleum ether (B.P. 40–60° C.)], ethyl α-(4-bromophenylthio)isobutyrate, B.P. 180° C./12 mm., M.P. 49° C., and α-(4-phenylphenylthio)isobutyric acid, M.P. 141° C. (from aqueous methanol).

Methyl α-(4-chlorophenylthio)isobutyrate may be obtained as follows:

1.5 parts of α-(4-chlorophenylthio)isobutyric acid are added to an excess of an ethereal solution of diazomethane, and the mixture is kept at ambient temperature for 18 hours. Excess diazomethane and ether are removed by distillation, and the residual solid is crystallised from petroleum ether (B.P. 40–60° C.). There is thus obtained methyl α-(4-chlorophenylthio)isobutyrate, M.P. 60° C.

In a similar manner there may be obtained methyl α-(4-bromophenylthio)isobutyrate, M.P. 71° C. [from petroleum ether (B.P. 40–60° C.)], methyl α-(4-chlorophenylsulphonyl)isobutyrate, M.P. 78° C. [from petroleum ether (B.P. 40–60° C.)] and n-propyl α-(4-chlorophenylthio)isobutyrate, B.P. 80° C./0.2 mm. (using diazopropane as esterifying agent).

The α-(4-methoxyphenylthio)isobutyric acid, M.P. 64° C., may be obtained in a similar manner to that described in Example 1 for the manufacture of α-(4-bromophenylthio)isobutyric acid except that the 4-bromothiophenol used as starting material is replaced by 4-methoxythiophenol.

Example 3

A mixture of 500 parts of calcium α-(4-chlorophenylthio)isobutyrate, 25 parts of androsterone, 94 parts of maize starch, 45 parts of alginic acid and 3.5 parts of magnesium stearate is compressed into slugs which are then broken into granules. The granules are passed through an 8-mesh screen and 3.5 parts of magnesium stearate are then added. The mixture is compressed into tablets which are suitable for oral administration for therapeutic purposes.

Example 4

A mixture of 500 parts of α-(4-chlorophenylsulphonyl)isobutyric acid, 94 parts of maize starch, 50 parts of androsterone and three parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol. 3 parts of magnesium stearate are then added to the granules, which are then compressed to give tablets suitable for oral use for therapeutic purposes.

The above process is repeated except that the α-(4-chlorophenylsulphonyl)isobutyric acid is replaced by α - (4 - bromophenylsulphonyl)isobutyric acid, α-(3,4-dichlorophenylsulphonyl)isobutyric acid, α-(4-chlorophenylsulphonyl)propionic acid or α-(4-chlorophenylsulphonyl)-α-methyl-n-butyric acid. There are thus obtained tablets suitable for oral use for therapeutic purposes.

The α-(4-chlorophenylsulphonyl)isobutyric acid used above may be obtained as follows:

A solution of 20 parts of potassium permanganate in 300 parts of water is added during 40 minutes to a cooled, stirred solution of 11 parts of α-(4-chlorophenylthio)isobutyric acid in 60 parts of glacial acetic acid. The temperature of the reaction mixture is kept between 20° C. and 22° C. during the addition. The mixture is stirred for 1 hour at ambient temperature, then cooled in ice, and excess sulphur dioxide is passed through. The mixture is filtered, and the solid residue is crystallised from hot water. There is thus obtained α-(4-chlorophenylsulphonyl)isobutyric acid, M.P. 147–148° C.

In a similar manner there may be obtained α-(4-bromophenylsulphonyl)isobutyric acid, M.P. 161° C. (from water), α-3,4 - dichlorophenylsulphonyl)isobutyric acid, M.P. 173–175° C. (from water), α-(4-chlorophenylsulphonyl)propionic acid, M.P. 118° C. (from benzene), and α-(4-chlorophenylsulphonyl)-α-methyl-n-butyric acid, M.P. 134° C. (from benzene).

Example 5

200 parts of potassium α-(4-chlorophenylthio)isobutyrate are dissolved in a mixture of 83 parts of water, 250 parts of glycerol and 125 parts of ethanol. To the resultant solution there is added a solution of 300 parts of sucrose in 150 parts of water. By the incorporation of a suitable flavouring agent and colouring matter, there is obtained a syrup suitable for oral administration for therapeutic purposes.

What I claim is:

1. A pharmaceutical composition for oral administration which comprises as active ingredient an aliphatic acid derivative selected from compounds of the formula X.A.CR$^1$R$^2$.COOH, wherein X is selected from phenyl or naphthyl or substituted phenyl or naphthyl wherein the substitution is halgoen, phenyl or alkoxy, A is selected from the sulphur atom and the sulphonyl group, R$^1$ is selected from hydrogen and alkyl of 1–6 carbon atoms, and R$^2$ is selected from hydrogen and alkyl of 1–6 carbon atoms, the lower alkyl esters thereof, the alkali metal salts thereof and the alkaline earth metal salts thereof, together with an inert non-toxic diluent or carrier.

2. A tablet including the composition according to claim 1.

3. A tablet including a composition according to claim 1, a disintegrating agent and a lubricating agent.

4. A capsule containing a composition according to claim 1.

5. A capsule containing a solid composition according to claim 1, and including a solid buffering agent.

6. A capsule containing a lower alkyl ester of an aliphatic acid derivative which is liquid at ambient temperature, said derivative being selected from compounds of the formula $X.A.CR^1R^2.COOH$, wherein X is selected from phenyl or naphthyl or substituted phenyl or naphthyl where the substitution is halogen, phenyl or alkoxy, A is selected from the sulphur atom and the sulphonyl group, $R^1$ is selected from hydrogen and alkyl of 1–6 carbon atoms and $R^2$ is selected from hydrogen and alkyl of 1–6 carbon atoms.

7. A capsule according to claim 4 containing a solution of the active ingredient in a pharmaceutically-acceptable oil.

8. A composition according to claim 1 which is a nutritive preparation wherein said active ingredient is admixed with proteins and carbohydrates.

9. A composition according to claim 8 including dietary supplements.

10. A composition for oral administration as claimed in claim 1 wherein the aliphatic acid derivative is selected from the group consisting of α-(4-chlorophenylthio)isobutyric acid or the methyl, ethyl or n-propyl ester thereof or the calcium or potassium salt thereof, α-(4-bromophenylthio)isobutyric acid or the methyl or ethyl ester thereof, α-(3,4-dichlorophenylthio)isobutyric acid, α-(2-naphthylthio)isobutyric acid or the ethyl ester thereof, α-(4-methoxyphenylthio)isobutyric acid, α-(4-phenylphenylthio)isobutyric acid, α-(4-chlorophenylthio)acetic acid, α-phenylthioacetic acid, α-(4-chlorophenylthio)propionic acid, α-(4-chlorophenylthio)-α-methyl-n-butyric acid or the ethyl ester thereof, α-(4-bromophenylthio)-α-methyl-n-butyric acid, α-(4-chlorophenylsulphonyl)isobutyric acid or the methyl ester thereof, α-(4-bromophenylsulphonyl)isobutyric acid, α-(3,4-dichlorophenylsulphonyl)isobutyric acid, α-(4-chlorophenylsulphonyl)-α-methyl-n-butyric acid, α-(4-chlorophenylsulphonyl)propionic acid or α-(2-naphthylsulphonyl)isobutyric acid.

11. A process for the reduction of serum lipid levels which comprises orally administering at least one aliphatic acid derivatvie selected from compounds of the formula $X.A.CR^1R^2.COOH$, wherein X is selected from phenyl or naphthyl or substituted phenyl or naphthyl wherein the substitution is halogen, phenyl or alkoxy, A is selected from the sulphur atom and the sulphonyl group, $R^1$ is selected from hydrogen and alkyl of 1–6 carbon atoms, $R^2$ is selected from hydrogen and alkyl of 1–6 carbon atoms, the lower alkyl esters thereof, the alkali metal salts thereof and the alkaline earth metal salts thereof.

References Cited

UNITED STATES PATENTS

| | | | |
|---|---|---|---|
| 3,098,078 | 7/1963 | Druey | 167—65.5 |
| 3,101,353 | 8/1963 | Bowers et al. | 167—65.5 |
| 3,151,134 | 9/1964 | Denot et al. | 167—65.5 |
| 3,169,136 | 2/1965 | Bowers et al. | 167—65.5 |

FOREIGN PATENTS 860,303   2/1961   Great Britain.

OTHER REFERENCES

Fawcett et al.: Chemical Abstracts, vol. 50, col. 1986(h)–1987(a), 1956.

Fawcett et al.: Chemical Abstracts, vol. 51, col. 15861(f).

Schjanberg Chemical Abstracts, vol. 37, col. 5704(1), 1943.

ALBERT T. MEYERS, *Primary Examiner.*

J. S. LEVITT, S. ROSEN, *Examiners.*

L. B. RANDALL, *Assistant Examiner.*